United States Patent [19]

Morita et al.

[11] 4,395,878
[45] Aug. 2, 1983

[54] CONTROL SYSTEM FOR HYDRAULICALLY DRIVEN VEHICLE

[75] Inventors: Koichi Morita, Isehara; Kenzo Hoashi, Yokohama, both of Japan

[73] Assignee: Kabushiki Kaisha Komatsu Seisakusho, Tokyo, Japan

[21] Appl. No.: 144,165

[22] Filed: Apr. 25, 1980

[30] Foreign Application Priority Data

Apr. 27, 1979 [JP] Japan .......................... 54/55950[U]

[51] Int. Cl.³ ............................................. F16H 39/46
[52] U.S. Cl. ...................................... 60/427; 60/444; 60/465; 60/488; 180/6.48; 180/307
[58] Field of Search ................. 180/6.48, 307; 60/427, 60/444, 420, 465, 488

[56] References Cited

U.S. PATENT DOCUMENTS

| | | | |
|---|---|---|---|
| 3,788,773 | 1/1974 | Vander Kolk | 60/444 |
| 3,788,774 | 1/1974 | Roesslein | 60/444 |
| 3,946,560 | 3/1976 | MacIntosh | 180/6.48 X |
| 3,999,387 | 12/1976 | Knopf | 60/444 |
| 4,188,789 | 2/1980 | Hamma | 60/488 |

FOREIGN PATENT DOCUMENTS 2165527 7/1973 Fed. Rep. of Germany ...... 180/307

*Primary Examiner*—George L. Walton
*Attorney, Agent, or Firm*—Armstrong, Nikaido, Marmelstein & Kubovcik

[57] ABSTRACT

A control system for a hydraulically driven vehicle having a pair of closed loop each including a variable displacement hydraulic pump driven by an engine and a variable displacement hydraulic motor, the control system comprising a charge pump driven by the engine, a directional control valve for speed control and forward and reverse change-over of the vehicle connected with the charge pump, a pair of steering valves connected with the directional control valve, a pair of servo controls each operatively connected with the respective variable displacement hydraulic pumps for controlling the displacement volume thereof, another charge pump driven by the engine, and a manually operated selector valve connected with the another charge pump and the servo controls, the selector valve having formed therein a throttling position and a communication position and normally held in the throttling position and being interlocked with the operation of the steering valves, whereby the selector valve is changed-over to its communication position when either one of the steering valves is manually operated.

4 Claims, 2 Drawing Figures

CONTROL SYSTEM FOR HYDRAULICALLY DRIVEN VEHICLE

BACKGROUND OF THE INVENTION

This invention relates to a control system for a hydraulically driven vehicle.

A hydraulically driven vehicle is generally provided with a pair of independent closed loops, each for driving one side of tracks or wheels. Each closed loop includes a variable displacement hydraulic pump driven by a prime mover such as an engine and a variable displacement hydraulic motor driven by the variable displacement hydraulic pump.

Displacement volume of each variable displacement hydraulic pump is controlled by changing the angle of a swash plate, which is connected to a servo control and operated thereby.

Each servo control comprises a servo cylinder operatively connected to the swash plate of each variable displacement hydraulic pump and a directional control valve connected with the servo cylinder. Each directional control valve is provided with a restrictor at the input side thereof and connected to a fixed displacement pump through the restrictor. The directional control valves are the pilot-operated type and pilot ports of which are connected with a pair of manually operated steering valves, which in turn are connected with a manually operated directional control valve for speed control and forward and reverse change-over of the vehicle. This manually operated directional control valve is connected with another fixed displacement charge pump. Since each directional control valve of the servo control is provided with the restrictor at the input side thereof, when the manually operated directional control valve for speed control and forward and reverse change-over is operated, hydraulic fluid flow introduced into the servo cylinders through the directional control valves is restricted, thereby preventing a sudden change in angle of the swash plates. As a result, shocks occuring at the acceleration and deceleration of the vehicle can effectively be reduced.

However, due to provision of the restrictors at the input sides of the directional control valves of the servo controls, even when one of the manually operated steering valves is operated, hydraulic fluid flowing into one of the servo cylinders is restricted, thereby causing a response lag of the changing in angle of the swash plate which may result in an excessive turning of the vehicle against the intention of the operator.

SUMMARY OF THE INVENTION

It is therefore an object of the present invention to provide an improved control system for a hydraulically driven vehicle which can overcome the above noted problems and provide a safe and smooth operation of the vehicle.

Another object of the present invention is to provide a control system for a hydraulically driven vehicle wherein hydraulic fluid flowing into servo cylinders is restricted only when a valve for speed control and forward and reverse change-over is operated and not restricted when one of the steering valves is operated.

In accordance with an aspect of the present invention, there is provided a control system for a hydraulically driven vehicle including a pair of variable displacement hydraulic pumps driven by a prime mover, and a pair of variable displacement hydraulic motors each being connected with the respective variable displacement hydraulic pumps in a closed loop and driven thereby, said control system comprising in combination:

a first fixed displacement charge pump driven by said prime mover;

directional control valve means for speed control and forward and reverse change-over of the vehicle connected at its input side with said first charge pump;

a pair of manually operated steering valve means each connected at its input side with the output side of said directional control valve means;

a pair of servo control means each operatively connected with said respective variable displacement hydraulic pumps for controlling the displacement volume thereof and comprising a double acting servo cylinder and a pilot-operated directional control valve associated with said servo cylinder, pilot ports of said pilot-operated directional control valves being connected with said respective steering valve means;

a second fixed displacement charge pump driven by said prime mover; and selector valve means connected at its input side with said second charge pump and at its output side with said pilot-operated directional control valves, said selector valve means having formed therein a throttling position and a communication position and normally held in the throttling position and being interlocked with the operation of said manually operated steering valve means;

whereby said selector valve means is changed-over to its communication position when either one of said steering valve means is operated.

The above and other objects, features and advantages of the present invention will be readily apparent from the following description taken in conjunction with the accompanying drawings.

DESCRIPTION OF THE PREFERRED EMBODIMENTS

Figure 1:
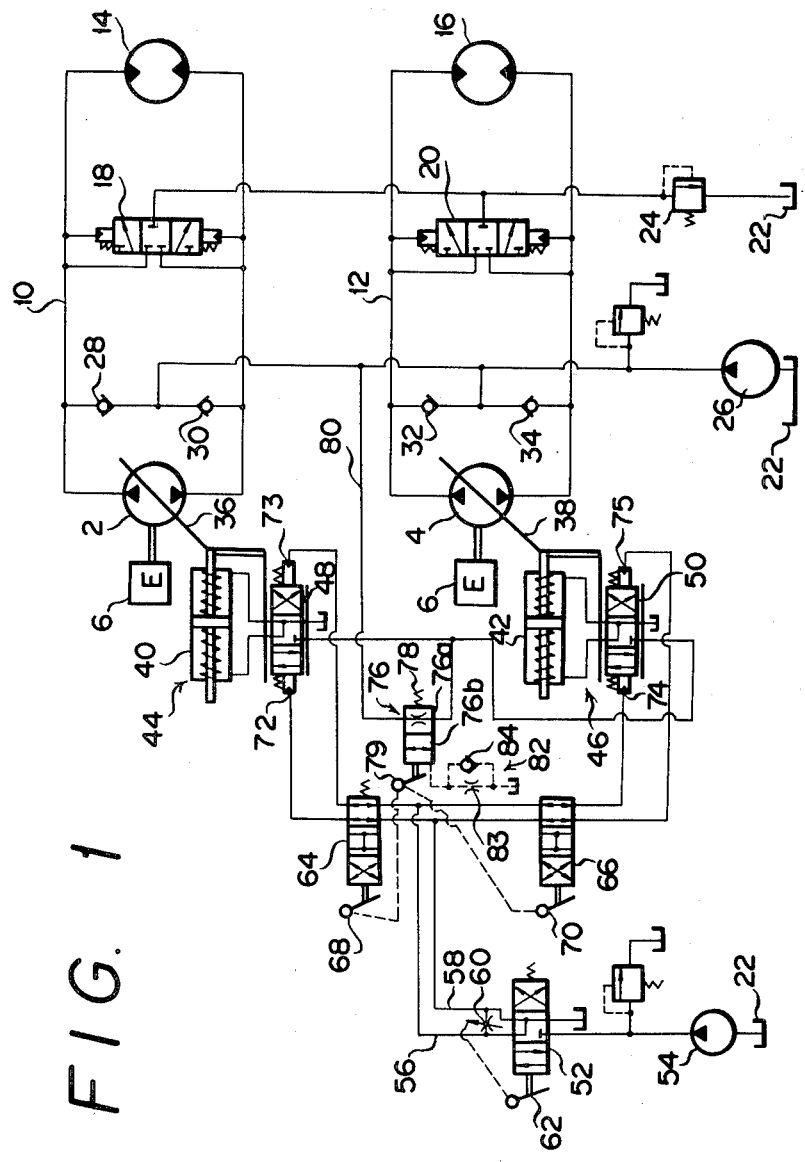
FIG. 1 shows an overall control system for a hydraulically driven vehicle according to the present invention.

The present invention will now be described in detail with reference to the accompanying drawings. Referring to FIG. 1, reference numerals 2 and 4 denote variable displacement hydraulic pumps driven by an engine 6. Connected with the respective variable displacement hydraulic pumps 2 and 4 in closed loops 10 and 12 and driven thereby are variable displacement hydraulic motors 14 and 16, respectively.

Connected in parallel with the respective variable displacement hydraulic motors 14 and 16 are shuttle valves 18 and 20, both of which are communicated with each other and connected with a reservoir 22 through a relief valve 24. Both closed loops 10 and 12 are connected with a fixed displacement charge pump 26 through check valves 28, 30 and 32, 34. The fixed displacement charge pump 26 is driven by the engine 6.

The variable displacement hydraulic pumps 2 and 4 have mounted therein swash plates 36 and 38, respectively, which are operatively connected to and controlled by servo cylinders 40 and 42 of respective servo controls 44 and 46. The servo controls 44 and 46 further includes pilot-operated three-position directional control valves 48 and 50, each connected with the respective servo cylinders 40 and 42.

Reference numeral 52 denotes a manually operated three-position directional control valve for speed control and forward and reverse change-over of the vehicle connected at the input side thereof with another fixed displacement charge pump 54 driven by the engine 6. Connected astride with output lines 56 and 58 from the directional control valve 52 is an adjustable restrictor 60 interlocked with a lever 62 of the directional control valve 52. The output lines 56 and 58 are connected with a pair of manually operated steering valves 64 and 66 of the directional control type. The steering valves 64 and 66 are connected to levers 68 and 70, respectively, and operated thereby.

The output sides of the steering valves 64 and 66 are connected with pilot ports 72, 73 and 74, 75 of the respective pilot-operated directional control valves 48 and 50.

Reference numeral 76 denotes a manually operated selector valve having a throttling position 76a and a communication position 76b formed therein and the selector valve 76 is normally held in the throttling position 76a by the force of a spring 78. The selector valve 76 has connected thereto a lever 79 interlocked with both levers 68 and 70 of the steering valves 64 and 66. The input side of the selector valve 76 is connected with the charge pump 26 through a line 80 and the output side thereof is connected with both pilot-operated directional control valves 48 and 50. Operatively connected with the selector valve 76 is a slow return valve 82 for reducing the return speed of the selector valve 76 from the communication position 76b to the throttling position 76a. The slow return valve 82 comprises a restrictor 83 and a check valve 84.

In operation, the vehicle is driven by the variable displacement hydraulic motors 14 and 16 which in turn are driven by the variable displacement hydraulic pumps 2 and 4. Since displacement volume of the variable displacement hydraulic pumps 2 and 4 are controlled by changing the angle of the swash plates 36 and 38, speed control and steering control of the vehicle are also effected by changing the angle of the swash plates 36 and 38.

When the manually operated directional control valve 52 for speed control and forward and reverse change-over of the vehicle is operated, hydraulic fluid from the charge pump 54 is introduced into the pilot ports 72, 73 and 74, 75 of the pilot-operated directional control valves 48 and 50 of the servo controls 44 and 46 through the manually operated directional control valve 52 and the manually operated steering valves 64 and 66, respectively.

As a result, the pilot-operated directional control valves 48 and 50 are shifted to either one of the offset positions. Therefore, hydraulic fluid from the charge pump 26 is introduced into the servo cylinders 40 and 42 through the manually operated selector valve 76 and the pilot-operated directional control valves 48 and 50, thereby changing the angle of the swash plates 36 and 38 in a direction to increase the displacement volume of the variable displacement hydraulic pumps 2 and 4. Consequently, the vehicle is started to move either forwardly or rearwardly. Since at this time the manually operated selector valve 76 remains in its throttling position 76a, even if the lever 62 of the manually operated directional control valve 52 is moved abruptly for a quick acceleration of deceleration, hydraulic fluid from the charge pump 26 is restricted through passing the throttling position 76a of the manually operated selector valve 76 before entering into the servo cylinders 40 and 42. Therefore, a sudden change in angle of the swash plates 36 and 38 are prevented and a smooth acceleration and deceleration of the vehicle can be realized even if the manually operated directional control valve 52 is operated abruptly.

When the operator wants to turn the vehicle in either direction, it is necessary to operate either one of the steering valves 64 and 66. When either one of the steering valves 64 and 66 is operated for turning the vehicle, the manually operated selector valve 76 is changed-over to its communication position 76b because the lever 79 thereof is interlocked with the levers 68 and 70 of the steering valves 64 and 66. Therefore, at the time of steering operation of the vehicle, hydraulic fluid from the charge pump 26 is introduced into either one of the servo cylinders 40 and 42 without passing through the restrictor of the manually operated selector valve 76. As a result, no time lag is observed in the response of the operation of the servo cylinders 40 and 42. In other words, a quick response of the variable displacement hydraulic pumps 2 and 4 can be assured at the time of steering or turning operations of the vehicle.

When the previously operated steering valve 64 or 66 is returned to its neutral position by the manipulation of the corresponding steering lever 68 or 70, the manually operated selector valve 76 resumes its throttling position 76a simultaneously. At this returning movement of the selector valve 76 from its communication position 76b to the throttling position 76a, however, the returning movement of the selector valve 76 is retarded by the operation of the slow return valve 82 connected thereto. Therefore even if either one of the steering valves 64 and 66 is returned to its neutral position abruptly, the selector valve 76 is returned slowly to its throttling position 76a, thus assuring a safe steering operation of the vehicle by preventing the fluid flow entering into either one of the servo cylinders 40 and 42 from being abruptly restricted.

Figure 2:
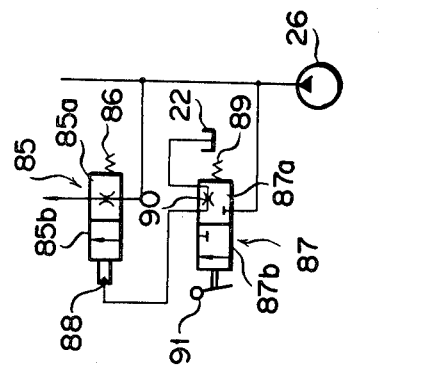
FIG. 2 is another embodiment of the present invention showing only prime component parts of the system.

Referring to FIG. 2, which shows another embodiment of the present invention, a pilot-operated selector valve 85 is connected at its input side with the charge pump 26 and at its output side with the pilot-operated directional control valves 48 and 50 shown in FIG. 1. The pilot-operated selector valve 85 has formed therein a throttling position 85a and a communication position 85b and is normally held in the throttling position 85a by a spring 86. Reference numeral 87 denotes a manually operated selector valve having its input side connected with the charge pump 26 and its output side connected with a pilot port 88 of the pilot-operated selector valve 85. The manually operated selector valve 87 has formed therein a blocking position 87a and a communication position 87b and is normally held in the blocking position 87a by the action of a spring 89. The blocking position 87a has formed therein a restrictor 90 through which the pilot port 88 of the pilot-operated selector valve 85 is connected with the reservoir 22. The manually operated selector valve 87 has connected thereto a lever 91 which in turn is interlocked with the levers 68 and 70 of the steering valves 64 and 66 in FIG. 1. Since all the remaining component parts are the same as those of FIG. 1, illustration and description thereto is omitted here.

In the operation, as long as the vehicle is running straight without operating either one of the steering valves 64 and 66, hydraulic fluid from the charge pump 26 is introduced into the servo cylinders 40 and 42 through passing the throttling position 85a of the pilot-operated selector valve 85. Therefore even if the lever 62 of the manually operated directional control valve 52 is moved abruptly for a quick acceleration or deceleration, a sudden change in angle of the swash plates 36 and 38 are prevented and smooth acceleration and deceleration of the vehicle can be effected.

When either one of the steering valves 64 and 66 is operated for turning the vehicle, the manually operated selector valve 87 is changed-over to its communication position 87b because the lever 91 thereof is interlocked with the levers 68 and 70 of the steering valves 64 and 66. As a result, hydraulic fluid from the charge pump 26 is introduced into the pilot port 88 of the pilot-operated selector valve 85 thereby shifting thereof to its communication position 85b. Therefore, at the time of steering operation of the vehicle, hydraulic fluid from the charge pump 26 is introduced into either one of the servo cylinders 40 and 42 without passing through the restrictor of the pilot-operated selector valve 85 thereby assuring a quick response of the variable displacement hydraulic pumps 2 and 4. Besides, the blocking position 87a of the manually operated selector valve 87 has the restrictor 90 formed therein, the return movement of the pilot-operated selector valve 85 from its communication position 85b to the throttling position 85a is retarded. Therefore even if the previously operated steering valve 64 or 66 is returned to its neutral position abruptly, the pilot-operated selector valve 85 is returned slowly to its throttling position 85a, thus assuring a safe steering operation of the vehicle by preventing the fluid flow entering into either one of the servo cylinders 40 and 42 from being abruptly restricted.

While preferred embodiments of the invention have been shown and described herein, it is to be understood that the embodiments are illustrative only and not to be taken a definition of the scope of the invention, reference being made for this purpose to the appended claims.

What we claim is:

1. A control system for a hydraulically driven vehicle including a pair of variable displacement hydraulic pumps driven by a prime mover, and a pair of variable displacement hydraulic motors each being connected with the respective variable displacement hydraulic pumps in a closed loop and driven thereby, said control system comprising in combination:
   a first fixed displacement charge pump driven by said prime mover;
   directional control valve means for speed control and forward and reverse change-over of the vehicle connected at its input side with said first charge pump;
   a pair of manually operated steering valve means each connected at its input side with the output side of said directional control valve means;
   a pair of servo control means each operatively connected with said respective variable displacement hydraulic pumps for controlling the displacement volume thereof and comprising a double acting servo cylinder and a pilot-operated directional control valve associated with said servo cylinder, pilot ports of said pilot-operated directional control valves being connected with said respective steering valve means;
   a second fixed displacement charge pump driven by said prime mover;
   selector valve means connected at its input side with said second charge pump and at its output side with said pilot-operated directional control valves for providing hydraulic fluid to said servo cylinders, said selector valve means having formed therein a throttling position and a communication position;
   means for normally holding said selector valve means in the throttling position; and
   means for interlocking said selector valve means with the operation of said manually operated steering valve means;
   whereby said selector valve means is changed-over to its communication position when either one of said steering valve means is operated.

2. A control system for a hydraulically driven vehicle as recited in claim 1, further comprising:
   means operatively connected with said selector valve means for reducing the return speed of said selector valve means from the communication position to the throttling position.

3. A control system for a hydraulically driven vehicle including a pair of variable displacement hydraulic motors each being connected with the respective variable displacement hydraulic pumps in a closed loop and driven thereby, said control system comprising in combination:
   a first fixed displacement charge pump driven by said prime mover;
   directional control valve means for speed control and forward and reverse change-over of the vehicle connected at its input side with said first charge pump;
   a pair of manually operated steering valve means each connected at its input side with the output side of said directional control valve means;
   a pair of servo control means each operatively connected with said respective variable displacement hydraulic pumps for controlling the displacement volume thereof and comprising a double acting servo cylinder and a pilot-operated directional control valve associated with said servo cylinder, pilot ports of said pilot-operated directional control valves being connected with said respective steering valve means;
   a second fixed displacement charge pump driven by said prime mover;
   pilot-operated first selector valve means connected at its input side with said second charge pump and at its output side with said pilot-operated directional control valves, said first selector valve means having formed therein a throttling position and a communication position;
   means for normally holding said first selector valve means in the throttling position;
   manually operated second selector valve means connected at its input side with said second charge pump and at its output side with a pilot port of said pilot-operated first selector valve means; and
   means for interlocking said manually operated selector valve means with the operation of said manually operated steering valve means;
   whereby said pilot-operated first selector valve means is changed-over to its communication position when either one of said steering valve means is operated.

4. A control system for a hydraulically driven vehicle as recited in claim 3 wherein said manually operated second selector valve means has a restrictor formed therein and the pilot port of said pilot-operated first selector valve means is connected with a reservoir through said restrictor thereby allowing the return speed of said pilot-operated first selector valve means from the communication position to the throttling position to be reduced.

* * * * *